US011476669B2

(12) United States Patent
Subramanian et al.

(10) Patent No.: US 11,476,669 B2
(45) Date of Patent: Oct. 18, 2022

(54) METHOD AND SYSTEM FOR BUILDING REINFORCEMENT LEARNING (RL) BASED MODEL FOR GENERATING BIDS

(71) Applicant: Tata Consultancy Services Limited, Mumbai (IN)

(72) Inventors: Easwara Subramanian, Hyderabad (IN); Avinash Achar, Chennai (IN); Yogesh Kumar Bichpuriya, Pune (IN); Sanjay Purushottam Bhat, Hyderabad (IN); Akshaya Natarajan, Chennai (IN); Venkatesh Sarangan, Chennai (IN); Abhay Pratap Singh, Sagar (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 381 days.

(21) Appl. No.: 16/897,842

(22) Filed: Jun. 10, 2020

(65) Prior Publication Data
US 2021/0021128 A1    Jan. 21, 2021

(30) Foreign Application Priority Data

Jun. 11, 2019    (IN) .............................. 201921023163

(51) Int. Cl.
*H02J 3/00*    (2006.01)
*G06N 20/00*    (2019.01)
(Continued)

(52) U.S. Cl.
CPC .............. *H02J 3/008* (2013.01); *G06F 17/11* (2013.01); *G06N 3/08* (2013.01); *G06N 20/00* (2019.01);
(Continued)

(58) Field of Classification Search
USPC ....................................................... 705/7.32
See application file for complete search history.

(56) References Cited

U.S. PATENT DOCUMENTS

| 2017/0228662 | A1* | 8/2017 | Gu ...................... G06N 3/0427 |
| 2019/0139159 | A1* | 5/2019 | Sarker .................... G06Q 50/06 |
| 2019/0147551 | A1* | 5/2019 | Sun .................... G06Q 30/0206 |
| | | | 700/291 |

FOREIGN PATENT DOCUMENTS

JP    5662446 B2 *  1/2015  ............. G06Q 30/02

OTHER PUBLICATIONS

Jin, Junqi, Real-Time Bidding with Multi-Agent Reinforcement Learning in Display Advertising, Sep. 2018, Alibaba Group, University College London, Shanghai JiaoTong Univeristy (Year: 2018).*

(Continued)

*Primary Examiner* — Brian M Epstein
*Assistant Examiner* — Kristin E Gavin
(74) *Attorney, Agent, or Firm* — Finnegan, Henderson, Farabow, Garrett & Dunner LLP

(57) ABSTRACT

In energy markets in which bidding process is used to sell energy, it is important that a mechanism for deciding bidding amount is in place. State of the art systems in this domain have the disadvantage that they rely on simulation data, and also they make certain assumptions, and both the factors can affect accuracy of results when the systems are deployed and are expected to handle practical scenarios. The disclosure herein generally relates to energy markets, and, more particularly, to a method and a system for Reinforcement Learning (RL) based model for generating bids. The system trains a RL agent using historical data with respect to competitor bids places and Market Clearing Prices (MCPs). The RL agent then processes real-time inputs and generates bidding recommendations.

12 Claims, 4 Drawing Sheets

(51) Int. Cl.
*G06Q 30/02* (2012.01)
*G06N 3/08* (2006.01)
*G06F 17/11* (2006.01)
*G06Q 10/06* (2012.01)
*G06Q 30/06* (2012.01)

(52) U.S. Cl.
CPC ......... *G06Q 10/0631* (2013.01); *G06Q 30/02* (2013.01); *G06Q 30/0202* (2013.01); *G06Q 30/0206* (2013.01); *G06Q 30/06* (2013.01); *H02J 3/003* (2020.01)

(56) References Cited

OTHER PUBLICATIONS

Krause, Thilo & Andersson, Göran & Ernst, Damien & Beck, E.V. & Cherkaoui, Rachid & Germond, Alain. (2012). Nash Equilibria and Reinforcement Learning for Active Decision Maker Modelling in Power Markets. (Year: 2012).*

Miksis, N.K. (2010). Masters Thesis. "Electric Power Market Modeling with Multi-Agent Reinforcement Learning," retrieved from https://scholarworks.umass.edu/cgi/viewcontent.cgi?article=1607&context=theses. 98 pages.

Rahimi-Kian, A. et al. "Reinforcement Learning Based Supplier-Agents for Electricity Markets," *Proceedings of the 2005 IEEE International Symposium on Intelligent Control*, Limassol, Cyprus, Jun. 27-29, 2005; pp. 1405-1410.

* cited by examiner

METHOD AND SYSTEM FOR BUILDING REINFORCEMENT LEARNING (RL) BASED MODEL FOR GENERATING BIDS

PRIORITY CLAIM

This U.S. patent application claims priority under 35 U.S.C. § 119 to: India Application No. 201921023163, filed on Jun. 11, 2019. The entire contents of the aforementioned application are incorporated herein by reference.

TECHNICAL FIELD

This disclosure relates generally to energy markets, and more particularly to a method and a system for Reinforcement Learning (RL) based model for generating bids.

BACKGROUND

In many countries, a bidding mechanism is used to sell electric energy. There are companies/organizations which generate the electric energy i.e. producers, there are end users/consumers, and in between the producers and consumers, there may be many entities. The generating companies bid to sell the power. During this process, the companies would try to make profit in comparison with their operational cost (referring to the sum they may have spent during generation and distribution of the energy). Such cost involved may vary based on many factors. For example, amount of money spent in generating nuclear energy may be less as compared to the amount spent in generating energy from solar or tidal sources. Many such constraints affect/govern the rates the companies may quote. The bids are collected and are matched against pre-specified rules, and the bids matching the rules are cleared. Out of the cleared bids, the highest bid wins. As the bidding and the associated business involve quite a lot of money, bidding if not efficiently performed can cause huge loss for the bidders. Identifying right amount for bidding is a cumbersome task as the same is governed/influenced by multiple parameters/factors.

The inventors here have recognized several technical problems with such conventional systems, as explained below. In traditional approaches, people or organizations who participate in the bidding process, had to rely on their expertise to make right assumptions with respect to bidding. However, this approach is prone to human errors, which in turn can cause losses. Various state of the art systems which address energy market scenario use different approaches. However, one disadvantage of such systems is that they rely at least partially on simulated data, which may affect results when the systems are deployed and are expected to work on real-time field data. Another disadvantage of such state of the art systems is that working of such systems depend a lot on certain assumptions, such as (i) demand remaining constant over time, (ii) the energy output of a generator remaining constant over time, (iii) a generator picking only a single price to bid all its output, and (iv) generators placing a bid only for the next time slot. However, in a practical scenario it is not necessary that such assumptions are true or are satisfied. As a result, performance of the systems are affected.

SUMMARY

Embodiments of the present disclosure present technological improvements as solutions to one or more of the above-mentioned technical problems recognized by the inventors in conventional systems. For example, in one embodiment, a system for reinforcement based bidding in an energy market is provided. The system includes a communication interface, a memory which includes a Markovian Decision Process (MDP) based model of the electric market, and one or more hardware processors. The one or more hardware processors generate one or more bidding recommendations using Reinforcement Learning (RL). In this approach, initially a RL agent of the system is trained by modeling interaction of the RL agent with the energy market model as a Markovian Decision Process (MDP). The training of the RL agent includes defining a state space of the RL agent by using a plurality of state space parameters comprising (i) a forecasted demand $D_{t+h}$ for the consumption slot t+h that is available at time slot t, (ii) a realized demand $D_{t+h-48}$ and a Maximum Clearing Price (MCP) $P_{t+h-48}$ at the time slot t+h−48 which precedes the consumption slot t+h by 24 hours, and (iii) a realized demand $D_{t+h-336}$ and MCP $P_{t+h-336}$ at the time slot which precedes the consumption slot by one week, as state space variables. The training of the RL agent further includes defining an action space of the RL agent, which involves defining one or more actions for each state s in the state space, wherein the one or more actions when executed, maximizes an estimated state-action value function $Q_\theta(s, a)$ of each state in the state space such that error between the estimated state-action value function $Q_\theta(s, a)$ and a true state action value function $Q(s,a)$ is minimum. The trained RL agent of the system when deployed in a real-time scenario, collects and processes real-time data to generate bids. While processing the one or more real-time inputs with respect to bidding at a time slot t for a consumption slot t+s, the RL agent observing a state s, and then determines an action from among a plurality of actions defined in the action space, for the state s being observed, as action that minimizes error between $Q_\theta(s,a)$ and $Q(s,a)$ for the state s. The RL agent then executes the determined action to generate a bid, which in turn is recommended to a user.

In another aspect, A processor implemented method for reinforcement based bidding in an energy market is provided. In this method, initially a RL agent of the system is trained by modeling interaction of the RL agent with the energy market model as a Markovian Decision Process (MDP). The training of the RL agent includes defining a state space of the RL agent by using a plurality of state space parameters comprising (i) a forecasted demand $D_{t+h}$ for the consumption slot t+h that is available at time slot t, (ii) a realized demand $D_{t+h-48}$ and a Maximum Clearing Price (MCP) $P_{t+h-48}$ at the time slot t+h−48 which precedes the consumption slot t+h by 24 hours, and (iii) a realized demand $D_{t+h-336}$ and MCP $P_{t+h-336}$ at the time slot which precedes the consumption slot by one week, as state space variables. The training of the RL agent further includes defining an action space of the RL agent, which involves defining one or more actions for each state s in the state space, wherein the one or more actions when executed, maximizes an estimated state-action value function $Q_\theta(s, a)$ of each state in the state space such that error between the estimated state-action value function $Q_\theta(s, a)$ and a true state action value function $Q(s, a)$ is minimum. The trained RL agent of the system when deployed in a real-time scenario, collects and processes real-time data to generate bids. While processing the one or more real-time inputs with respect to bidding at a time slot t for a consumption slot t+s, the RL agent observing a state s, and then determines an action from among a plurality of actions defined in the action space, for the state s being observed, as action that minimizes error between $Q_\theta(s, a)$ and $Q(s, a)$ for the state s. The RL agent then executes the determined action to generate a bid, which in turn is recommended to a user.

In yet another aspect, a non-transitory computer readable medium for reinforcement based bidding in an energy market is provided. The non-transitory computer readable medium initially trains a RL agent of the system by modeling interaction of the RL agent with the energy market model as a Markovian Decision Process (MDP). The training of the RL agent includes defining a state space of the RL agent by using a plurality of state space parameters comprising (i) a forecasted demand $D_{t+h}$ for the consumption slot t+h that is available at time slot t, (ii) a realized demand $D_{t+h-48}$ and a Maximum Clearing Price (MCP) $P_{t+h-48}$ at the time slot t+h−48 which precedes the consumption slot t+h by 24 hours, and (iii) a realized demand $D_{t+h-336}$ and MCP $P_{t+h-336}$ at the time slot which precedes the consumption slot by one week, as state space variables. The training of the RL agent further includes defining an action space of the RL agent, which involves defining one or more actions for each state s in the state space, wherein the one or more actions when executed, maximizes an estimated state-action value function $Q_\theta(s, a)$ of each state in the state space such that error between the estimated state-action value function $Q_\theta(s, a)$ and a true state action value function $Q(s, a)$ is minimum. The trained RL agent of the system when deployed in a real-time scenario, collects and processes real-time data to generate bids. While processing the one or more real-time inputs with respect to bidding at a time slot t for a consumption slot t+s, the RL agent observing a state s, and then determines an action from among a plurality of actions defined in the action space, for the state s being observed, as action that minimizes error between $Q_\theta(s, a)$ and $Q(s, a)$ for the state s. The RL agent then executes the determined action to generate a bid, which in turn is recommended to a user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
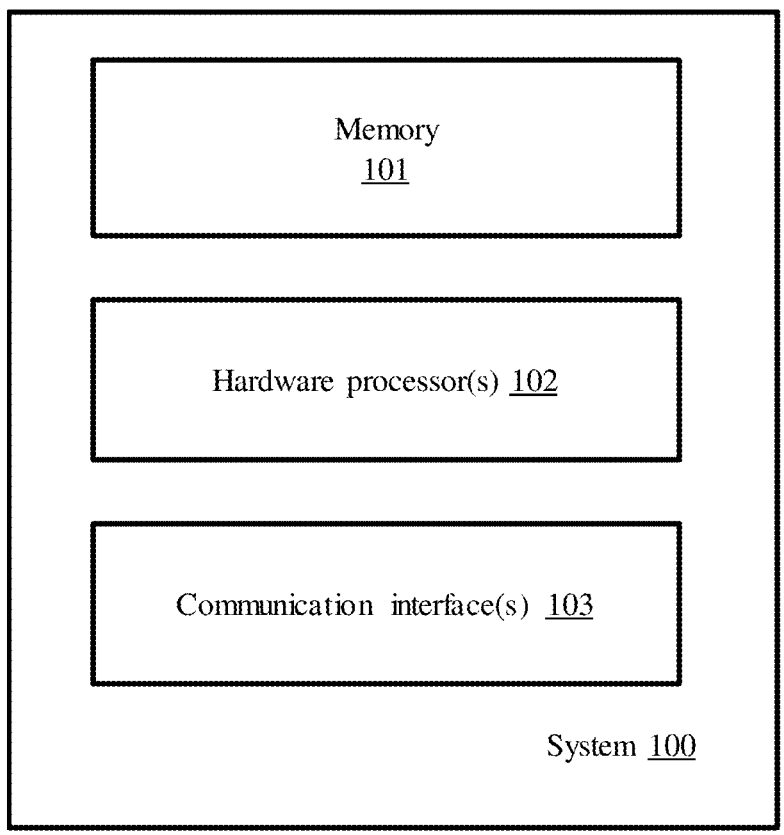
FIG. 1 illustrates an exemplary system for building a Reinforcement Learning (RL) based model for generating bids, according to some embodiments of the present disclosure.

FIG. 1 illustrates an exemplary system 100 for building a Reinforcement Learning (RL) based model for bid generation, according to some embodiments of the present disclosure. The system 100 includes at least one memory 101, one or more hardware processors 102, and at least one communication interface 103.

The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the hardware processor(s) 102 are configured to fetch and execute computer-readable instructions stored in the memory 101, which causes the hardware processor(s) 102 to perform one or more actions associated with the bid generation. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

Figure 2:
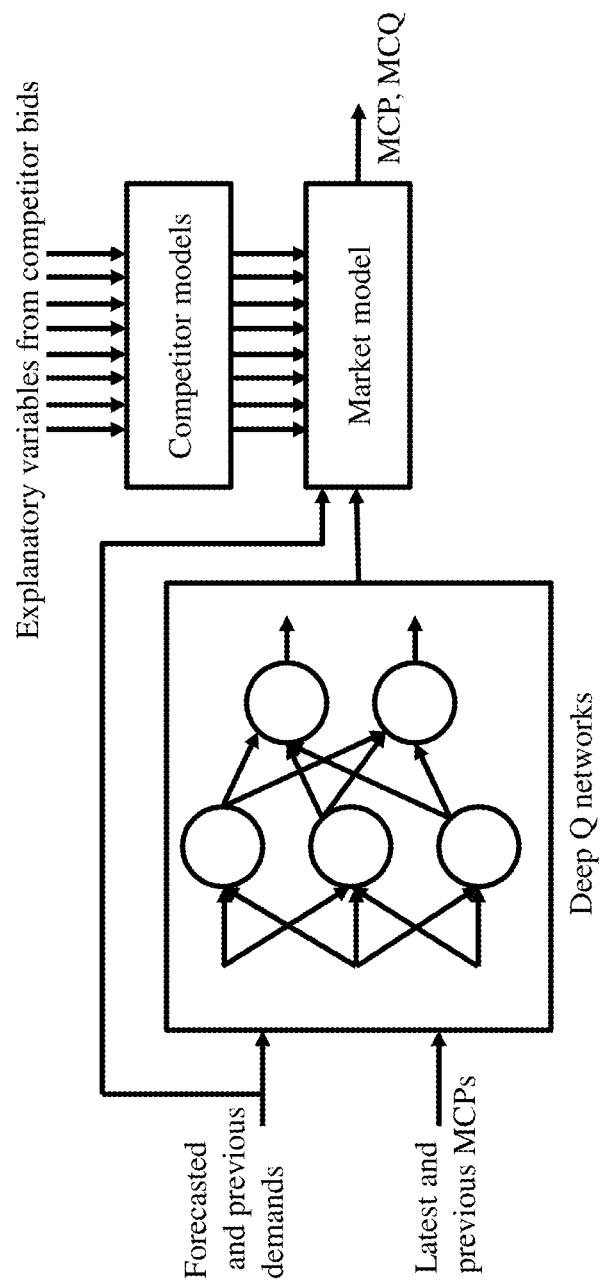
FIG. 2 illustrates a schematic representation of training a RL agent using the system of FIG. 1, according to some embodiments of the present disclosure.
Figure 3:
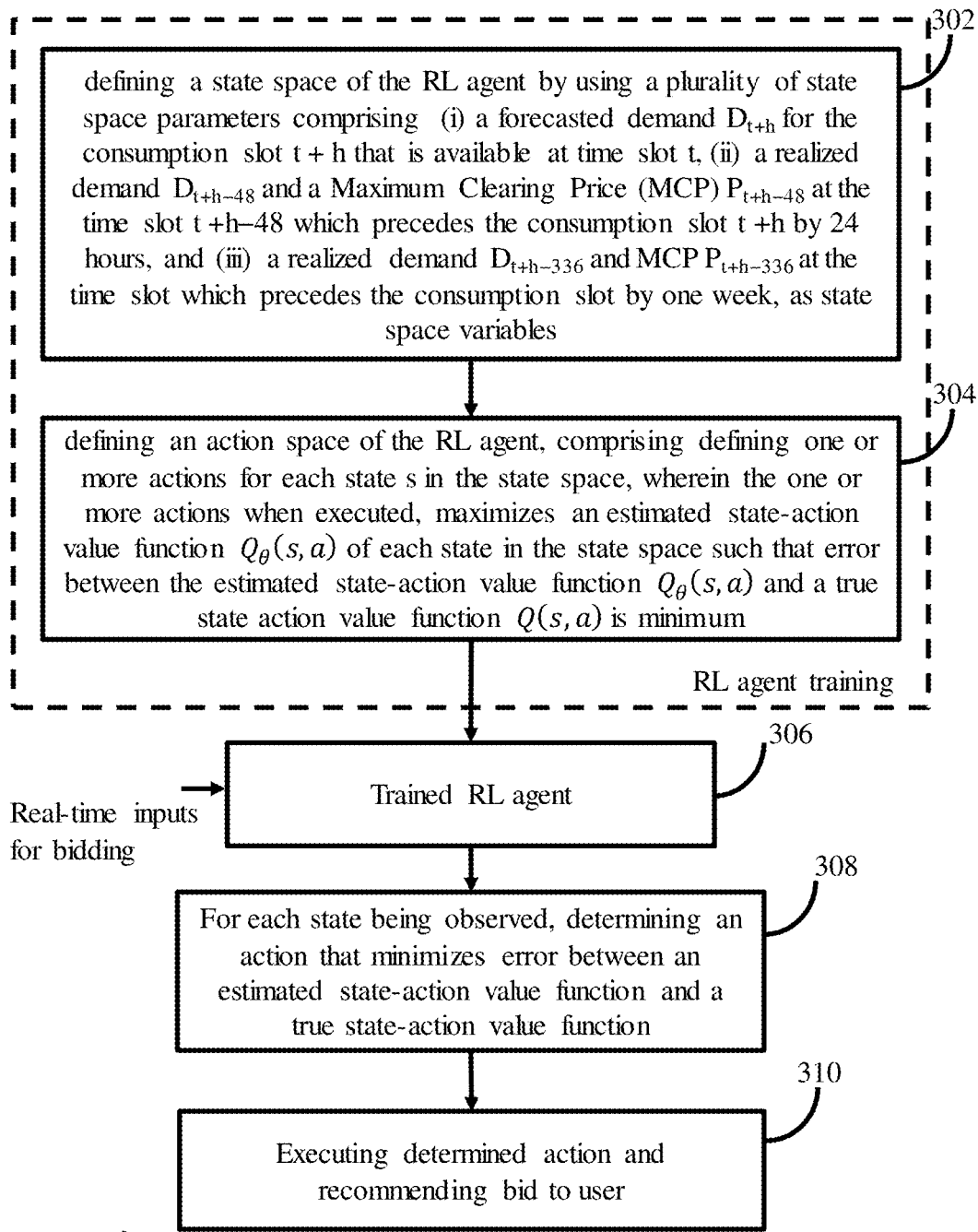
FIG. 3 is a flow diagram depicting steps involved in the processes of training the RL agent and using the RL agent to generate bid recommendations to a user, according to some embodiments of the present disclosure.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 101. The memory 101 stores a plurality of instructions which when executed, cause the one or more hardware processors 102 to perform the actions associated with building of the RL based model for bid generation depicted in FIG. 2 and FIG. 3. Various steps given in description of FIG. 2 and FIG. 3 are in reference to the system 100 and components of the system 100 thereof. In addition to the plurality of instructions, the memory 101 stores any other data, which may be collected as input, or may be generated during data processing being handled by the system 100 during training of the RL agent and/or for generating the bid recommendations for a given set of real-time inputs, and/or the bidding recommendations generated for each input set. For example, the memory 101 stores in one or more associated databases, information on state space and action space variables defined for the RL agent of the system 100. The RL agent is realized using one or more of the hardware processors 102 of the system 100. In an embodiment, terms 'RL agent', 'agent' and so on are used interchangeably.

The system 100 uses reinforcement learning (RL) to train an agent to place price and quantity bids in the market so as to improve its total profit over a performance horizon of 48 half-hour bidding slots spanning one day. The system 100 models the agent's interaction with the market as a Markov Decision Process (MDP). The system 100 uses information pertaining to various parameters historical information across a pre-defined time period corresponding to the one or more energy generators in one or more energy markets, the historical information including a demand, a clearing price, number of bids placed by the one or more energy generators, and an actual quantity of generation cleared by a market operator for the one or more energy generators, which form a market clearing model and a competitor model respectively, built using the historical information/logs. Details of these market clearing model and a competitor model are given in Indian patent application 201921023159, filed on 11 of Jun. 2019.

In an MDP formulation, at each decision epoch t, the agent observes the state s of the environment, takes an action a and receives a reward r that may depend on both the state s and the action a. The agent's action causes the state of the environment to change in a probabilistic manner. The agent's optimization problem is to find a decision strategy to maximize the sum of rewards over a finite horizon of decision epochs. In the RL setting, the dynamics of the environment are not known to the agent, and therefore the agent's optimal strategy needs to be learned only from observed outcomes of past decisions. In bidding problem as being defined and addressed by the present disclosure, each decision epoch represents a bidding opportunity for one of the next 48 future consumption slots, while the agent's set of ten price-quantity bids constitute the action at that decision epoch. The agent's reward for each decision taken is the profit earned by the agent based on market clearance for each consumption slot.

For training the RL agent, the system 100 defines (302) a state space for the RL agent. Details of the state space of the RL agent are given below.

State Space of the RL Agent:

In order to trade off accuracy with computational tractability, it is important to choose a parsimonious state representation which only includes that information which is most pertinent to the bidding task. When training or bidding at time slot t for a future consumption slot t+h, where h∈{1, 2, . . . , 48}, the system 100 chooses the following as state variables: (i) the forecasted demand $D_{t+h}$ for the consumption slot t+h that is available at time slot t, (ii) realized demand $D_{t+h-48}$ and MCP $P_{t+h-48}$ at the time slot t+h−48 which precedes the consumption slot t+h by 24 hours, and (iii) realized demand $D_{t+h-336}$ and MCP $P_{t+h-336}$ at the time slot which precedes the consumption slot by exactly one week. Thus the state vector when bidding time at slot t for a consumption slot t+h is:

$$s = D_{t+h}, D_{t+h-48}, D_{t+h-336}, P_{t+h-48}, P_{t+h-336} \quad (1)$$

The system 100 uses a Deep Q-Network (DQN) algorithm to realize a trained agent. The DQN algorithm is built around a neural network that approximates the best possible action-value function denoted by Q(s, a) for state s and action a. In other words, the value of Q(s, a) is the one that the agent can hope to receive by applying action a when it is in state s, and then subsequently applying optimal actions till the end of the performance horizon. Increasing the value of Q(s,a) for any agent is likely to maximize profit/reward. Training involves iteratively updating the parameter 8 to reduce the error between the estimated state-action value function $Q_\theta(s,a)$ and the true but unknown state-action value function Q(s, a). When in state 's', the trained agent applies the action a that yields a maximum value for $Q_{\theta^*}(s, a)$, where the parameter value θ* represents the trained neural network.

For training the RL agent, the system 100 also defines (304) an action space for the RL agent. Details of the action space of the RL agent are given below.

Action Space of the RL Agent:

In order to tractably compute actions that maximize the estimated state-action value function $Q_\theta(s, a)$ at a state s, it is important to keep the number of actions finite and preferably, small. On the other hand, the agent has to act in the real world by placing price and quantity bids that can take values in a continuous range. Such conflicting requirements are reconciled by introducing a few simplifications:

1. An agent has to place bids for all the 48 slots of the next day simultaneously and the bids for all the 48 slots are cleared in parallel by the market. If the system reliability and transient stability requirements of the market operator is overtaken and if it is assumed that a generator has the ability to ramp up or ramp down its generation quantity across the sequence of 48 time slots as required, then the decision to arrive at the <p, q> values for each time slot becomes independent of each other (if the demand for the time slots are known). In other words, the act of placing bids for all the 48 time slots can be decomposed to a sequence of 48 independent single time-slot bids (which can be executed in parallel). In other words, the action space can be modeled so as to consider the problem of generating bids for one time slot alone (rather than 48 time slots).
2. It has been observed that certain generating units place bids in the same 10 price bands, with only the quantity bids placed in those price bands varying from auction to auction.
3. It has been also observed that the total power bid by the generating unit in any auction was found equal to the generating capacity of the unit. In other words, certain generators belonged to the constant TBQ set.

Observations 2 and 3 suggest that it is enough to freeze the price bands in which bids are to be placed, and the only decision the agent needs to take is how to bid its total generating capacity across these price bands. A possible percentage distribution of the total generating capacity across the 10 price bands is referred to as a 'quantity bid profile'. To simplify the selection of an optimal quantity bid profile, all the bid profiles historically used by the generating unit were clustered into 5 clusters using the k-means clustering algorithm. The mean centroid quantity bid profile of each cluster was chosen as a candidate quantity bid profile. In addition, four pre-fixed quantity bid profiles were included in the list of candidates, namely: (i) a profile that increases from a low value in the lowest price band to a maximum in the highest price band, (ii) a profile that decreases from a maximum in the lowest price band to a minimum in the highest price band, (iii) a triangular profile that has a minimum in the lowest and highest price bands and achieves a maximum in the middle, and finally (iv) a constant profile. The agent's decision space at each auction was then restricted to simply choosing a quantity bid profile from these selected 9 profiles. The action space of the agent can be made richer by considering additional profiles which also increases the training complexity.

Training of the RL Agent:

When being trained by the system 100, the agent observes a state 's' when bidding at time slot t for a consumption slot t+s, s∈{1, . . . 48}, and places a set of 10 quantity bids by selecting the action that maximizes the approximate state-action value function $Q_\theta(s,a)$. The bids of competing agents are simulated by invoking supervised learning models. A market model clears the market based on the bids of the learning agents and all competing agents, and updates the state to s'. The dispatched bid of the agent results in a revenue to the agent equal to the product of the quantity dispatched and the MCP. At the same time, the agent incurs fixed and variable per unit costs on the quantity of power produced and dispatched. The difference between the revenue and the cost is the profit that the agent receives as immediate reward. Each time slot thus results in a state transition (s, a, s') along with the accompanying immediate reward. The parameter vector θ of the neural network is updated in accordance with the DQN algorithm from several state transitions accumulated over time. The neural network used has three hidden layers with 10 units each in the first two hidden layers, and 5 units in the third hidden layer. In addition, the network has an input layer with as many inputs as the number of state variables, and an output layer with as many units as the number of discrete actions that the agent has to choose from. All units use the Rectified Linear Units (ReLU) activation function, and the optimizer used during training is RMSProp. A schematic of the training is depicted in FIG. 2.

The system 100 uses demand data from the historical logs for training the RL agent since the demand is typically independent of the generator bidding behavior. However, it is to be noted that the historical behavior of the competition observed in the logs may not be appropriate for training the RL agent. This is because, the market clearing price and quantity realized during training could be different from that of the historical logs (owing to the RL agent submitting a bid different from that of the historical logs). Consequently, the competition behavior may evolve differently from that observed in the historical logs which needs to be captured during training. Hence, the competition models are used during the RL agent's training. Further, with the help of competition and market models, the RL agent can be trained for a longer duration (than what is available in the historical logs) by looping the historical demand data.

The RL algorithm, has an explore-exploit trade off parameter which aids the agent in choosing previously unexplored actions. This parameter is set to a high value in the beginning of the training process helping the agent to choose different possible actions and understand the corresponding reward signals. The parameter is decayed during the training epochs as the agent learns to choose actions that maximize reward.

A trained RL agent, at step 306, when used to process real-time input data to generate bidding recommendations, follows the same approach explained under the "training of the RL agent" section to generate the bidding recommendation for the given input data, i.e. for a state being observed, the RL agent computes an estimated state-action value function for each of a plurality of actions in the action space. Further the system 100 compares the estimated state-action value function of each of the actions with value of the pre-defined true state-action function and determines error between the estimated state-action value function and the true state-action function. By comparing the error generated for the actions in the action space, the system 100 determines (308) an action from among a plurality of actions defined in the action space, for the state s being observed, as action that minimizes error between $Q_\theta(s, a)$ and $Q(s, a)$ for the state s and executes the action with least value of error, and executes (310) the determined action with least value of error to generate the bidding recommendation. The bid suggestions generated by the system 100 via the agent may be used by one or more users while placing the bids.

Experimental Results:

In order to compare the performance of the RL agent against the historical performance, data from a region in National Energy Market (NEM) for a period of 26 days each in summer and winter of 2016 was considered. For sake of brevity, results obtained from the 26 days during winter of 2016 are discussed. Bidding over this 26 day period were considered as different realizations of the underlying process rather than as a time series. This is because, the temporal correlations governing the behavior of the competitive generators across days (as found in the historical logs) break down due to the different market clearing price and quantity arising out of the RL agent's different bidding behavior. Therefore, the performance of the RL agent is compared against the performance historically observed during each of the 26 realizations.

To find the RL agent's performance on a given historical day, the historical bid placed by the generator of interest was replaced with the bid value suggested by the RL agent. Further, the new market clearing price and quantity were estimated under this new bid (along with the historical bids of the competition) using data from the market model. Note that in the historical logs, the bids submitted by the participating generators get cleared by a NEMDE market engine, and as this is different from the market model used by the system 100, this difference can introduce bias in the estimates of the new market clearing price and quantity resulting with the participation of the RL agent. This effect is nullified in comparison with the historical performance as follows. The historical bid values submitted by all the generators to the market model used by the system 100 are fed to obtain estimates of the historical market clearing price and quantity. The performance comparisons are then made between the market clearing price and quantity estimated by the market model with and without the bids submitted by the RL agent.

Performance of RL Agent During the Experiment:

The RL agent's performance in placing bids is measured in terms of the following metrics:

Cumulative revenue: Revenue is defined as the product of the market clearing price (MCP) and quantity of generation cleared for a generator in a given time slot. The revenue generated in each time slot is calculated and the total revenue accumulated over a day is taken as a performance metric.

Cumulative profit: Profit is defined as the difference between revenue earned in a given time slot and the cost of generation in that time slot. Any cost involved in disbursing the generated power is also deducted from the revenue to determine the profit. As with revenue, even the profits are accumulated over a day and this total profit is taken as the performance metric.

Cleared bid Quantity (CBQ) Ratio: The CBQ is calculated as the ratio between total cleared quantity for the plant and maximum quantity available with the plant for bidding. This ratio is calculated at every time slot of the day and averaged over all days of the testing period. This metric gives an indication of the generator's utilization and hence is useful from the perspective of generator operators.

Figure 4A:
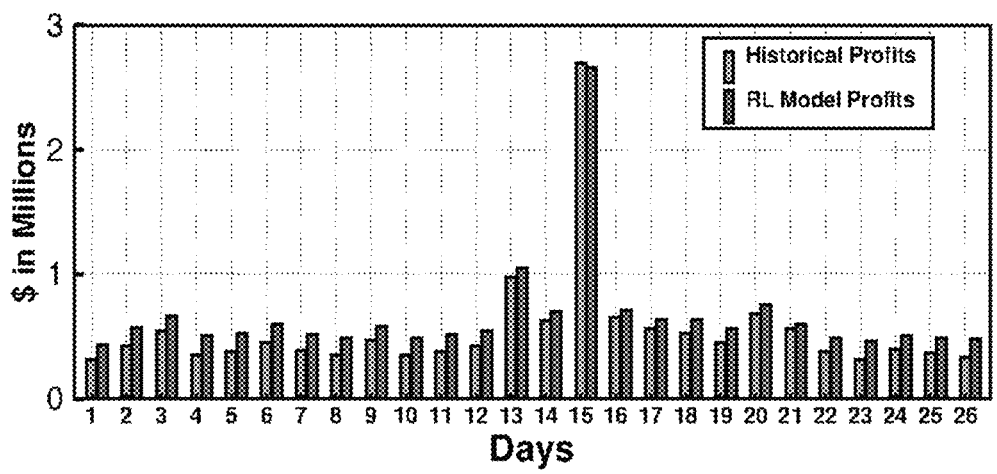
FIGS. 4a and 4b are exemplary graphs showing advantage of the RL agent based bid prediction over a state of the art technique, as experimental results of the system of FIG. 1, according to some embodiments of the present disclosure.
Figure 4B:
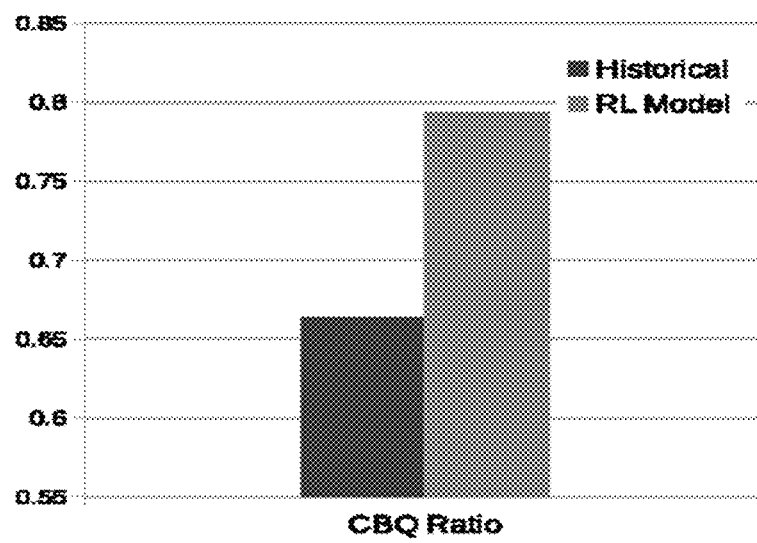

FIGS. 4a and 4b are exemplary graphs showing advantage of the RL agent based bid prediction over a state of the art technique, as experimental results of the system of FIG. 1, according to some embodiments of the present disclosure. FIG. 4a gives the performance of the RL bidding agent alongside the historical values for each of the days. As can be seen, for most of the days, the RL agent performs better in terms of profit (as well as revenue). This shows that the RL strategy does not compromise one metric for the sake of the other—since revenue can be increased at the cost of profit by bidding large quantities at lower prices and vice-versa. As can be seen from FIG. 4b, the RL agent increases the average values of the profit and revenue observed across these 26 days by nearly 20% and 15% respectively over historical bidding. In the similar way, an increase in average cleared bid quantity ratio also was seen across the 26 days for the RL agent and historical bidding. Clearly, the RL agent performs better on this metric as well. In fact, the RL agent improves the cleared bid ratio by nearly 20% which in turn implies that the generator's utilization improves by an equivalent percentage.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for reinforcement based bidding in an energy market, comprising: a communication interface; a memory, wherein the memory comprises a Markovian Decision Process (MDP) based model of the energy market; one or more hardware processors, wherein the one or more hardware processors generate one or more bidding recommendations using Reinforcement Learning (RL), comprising: training a RL agent of the system, by modeling interaction of the RL agent with the MDP based model of the energy market as a Markovian Decision Process (MDP), comprising: defining a state space of the RL agent by using a plurality of state space parameters comprising (i) a forecasted demand $D_{t+h}$ for a consumption slot t+h that is available at time slot t, (ii) a realized demand $D_{t+h-48}$ and a Maximum Clearing Price (MCP) $P_{t+h-48}$ at the time slot t+h−48 which precedes the consumption slot t+h by 24 hours, and (iii) a realized demand $D_{t+h-336}$ and MCP $P_{t+h-336}$ at the time slot which precedes the consumption slot by one week, as state space variables; and defining an action space of the RL agent, comprising defining one or more actions for each state 's' in the state space, wherein the one or more actions when executed, maximize an estimated state-action value function $Q_0(s,a)$ of each state in the state space to minimize error between the estimated state-action value function $Q_0(s, a)$ and a true state action value function $Q(s, a)$ is minimum; and processing one or more real-time inputs by the RL agent, comprising: observing a state 's' while bidding at a time slot t for a consumption
  determining an action from among a plurality of actions defined in the action space, for the state s being observed, as action that minimizes error between $Q_0(s, a)$ and $Q(s, a)$ for the state s; executing the determined action to generate a bid; and recommending the generated bid to a user.

2. The system as claimed in claim 1, wherein the MDP based model of the energy market comprises: a first sub-model, wherein the first sub-model models a market clearing operation as an optimization problem as a function of price, maximum quantity of electric energy that can be supplied by a generator in a region m during time t, quantum of power flow through one or more transmission links in the region; and a second sub-model, wherein the second sub-model estimates bids from each competitor, for each generator being considered.

3. The system as claimed in claim 1, wherein the system determines the action for the state s being observed, by: determining error between $Q_0(s, a)$ and $Q(s, a)$ for the state s, for each of the one or more actions in the action space; comparing the error determined for the one or more actions with one another; and determining the action having least value of error, as the action that minimizes error between $Q_0(s, a)$ and $Q(s, a)$ for the state s.

4. The system as claimed in claim 1, wherein observing the state space s at time t for a consumption slot t+s by the system comprises obtaining value of each of the state space parameter from a historical information across a pre-defined time period corresponding to one or more competitors, the historical information comprising a demand, a clearing price, number of bids placed by the one or more energy generators, and an actual quantity of generation cleared by a market operator for the one or more competitors.

5. A processor implemented method for reinforcement based bidding in an energy market, comprising: training a RL agent of a system, via one or more hardware processors, by modeling interaction of the RL agent with a Markovian Decision Process (MDP) based model of the energy market as a Markovian Decision Process, comprising: defining a state space of the RL agent by using a plurality of state space parameters comprising (i) a forecasted demand $D_{t+h}$ for a consumption slot t+h that is available at time slot t, (ii) a realized demand Dt+h−48 and a Maximum Clearing Price (MCP) Pt+h−48 at the time slot t+h−48 which precedes the consumption slot t+h by 24 hours, and (iii) a realized demand Dt+h−336 and MCP Pt+h−336 at the time slot which precedes the consumption slot by one week, as state space variables; and defining an action space of the RL agent, comprising defining one or more actions for each state s in the state space, wherein the one or more actions when executed, maximizes an estimated state-action value function Q0(s,a) of each state in the state space to minimize error between the estimated state-action value function Q0(s, a) and a true state action value function Q(s, a) is minimum; and processing one or more real-time inputs by the RL agent, via the one or more hardware processors, comprising: observing a state s while bidding at a time slot t for a consumption slot t+s; determining an action from among a plurality of actions defined in the action space, for the state s being observed, as action that minimizes error between Q0(s, a) and Q(s, a) for the state s; executing the determined action to generate a bid; and recommending the generated bid to a user.

6. The processor implemented method as claimed in claim 5, wherein the MDP based model of the electric market comprises: a first sub-model, wherein the first sub-model models a market clearing operation as an optimization problem as a function of price, maximum quantity of electric energy that can be supplied by a generator in a region m during time t, quantum of power flow through one or more transmission links in the region; and a second sub-model, wherein the second sub-model estimates bids from each competitor, for each generator being considered.

7. The processor implemented method as claimed in claim 5, wherein determining the action for the state s being observed, comprises: determining error between $Q_0(s, a)$ and $Q(s, a)$ for the state s, for each of the one or more actions in the action space; comparing the error determined for the one or more actions with one another; and determining the action having least value of error, as the action that minimizes error between $Q_0(s, a)$ and $Q(s, a)$ for the state s.

8. The processor implemented method as claimed in claim 5, wherein observing the state space s at time t for a consumption slot t+s comprises obtaining value of each of the state space parameter from a historical information across a pre-defined time period corresponding to one or more competitors, the historical information comprising a demand, a clearing price, number of bids placed by the one or more energy generators, and an actual quantity of generation cleared by a market operator for the one or more competitors.

9. A non-transitory computer readable medium for reinforcement based bidding in an energy market, wherein the reinforcement based bidding comprising: training a RL agent of a system, via one or more hardware processors, by modeling interaction of the RL agent with a Markovian Decision Process (MDP) based model of the energy market as a Markovian Decision Process, comprising: defining a state space of the RL agent by using a plurality of state space parameters comprising (i) a forecasted demand Dt+h for a consumption slot t+h that is available at time slot t, (ii) a realized demand Dt+h−48 and a Maximum Clearing Price (MCP) Pt+h−48 at the time slot t+h−48 which precedes the consumption slot t+h by 24 hours, and (iii) a realized demand Dt+h−336 and MCP Pt+h−336 at the time slot which precedes the consumption slot by one week, as state space variables; and defining an action space of the RL agent, comprising defining one or more actions for each state s in the state space, wherein the one or more actions when executed, maximizes an estimated state-action value function $Q_0(s,a)$ of each state in the state space to minimize error between the estimated state-action value function $Q_0(s, a)$ and a true state action value function $Q(s, a)$ is minimum; and processing one or more real-time inputs by the RL agent, via the one or more hardware processors, comprising: observing a state s while bidding at a time slot t for a consumption slot t+s determining an action from among a plurality of actions defined in the action space, for the state s being observed, as action that minimizes error between $Q_0(s, a)$ and $Q(s, a)$ for the state s; executing the determined action to generate a bid; and recommending the generated bid to a user.

10. The non-transitory computer readable medium as claimed in claim 9, wherein the MDP based model of the electric market comprises: a first sub-model, wherein the first sub-model models a market clearing operation as an optimization problem as a function of price, maximum quantity of electric energy that can be supplied by a generator in a region m during time t, quantum of power flow through one or more transmission links in the region; and a second sub-model, wherein the second sub-model estimates bids from each competitor, for each generator being considered.

11. The non-transitory computer readable medium as claimed in claim 9, wherein determining the action for the state s being observed, comprises: determining error between Q6(s, a) and Q(s, a) for the state s, for each of the one or more actions in the action space; comparing the error determined for the one or more actions with one another; and determining the action having least value of error, as the action that minimizes error between QB(s, a) and Q(s, a) for the state s.

12. The non-transitory computer readable medium as claimed in claim 9, wherein observing the state space s at time t for a consumption slot t+s comprises obtaining value of each of the state space parameter from a historical information across a pre-defined time period corresponding to one or more competitors, the historical information comprising a demand, a clearing price, number of bids placed by the one or more energy generators, and an actual quantity of generation cleared by a market operator for the one or more competitors.

* * * * *